US010048913B2

(12) United States Patent
Tecu

(10) Patent No.: US 10,048,913 B2
(45) Date of Patent: Aug. 14, 2018

(54) ELECTRONIC CONTENT MANAGEMENT WORKFLOW WITH DOCUMENT VERSIONING

(71) Applicant: Konica Minolta Laboratory U.S.A., Inc., San Mateo, CA (US)

(72) Inventor: Kirk Steven Tecu, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 591 days.

(21) Appl. No.: 13/956,214

(22) Filed: Jul. 31, 2013

(65) Prior Publication Data

US 2015/0039990 A1    Feb. 5, 2015

(51) Int. Cl.
*G06F 17/00* (2006.01)
*G06F 3/12* (2006.01)
*G06Q 30/00* (2012.01)
*G06F 17/22* (2006.01)

(52) U.S. Cl.
CPC .......... *G06F 3/1275* (2013.01); *G06F 3/1204* (2013.01); *G06F 3/1267* (2013.01); *G06F 3/1285* (2013.01); *G06F 3/1271* (2013.01); *G06F 17/2288* (2013.01)

(58) Field of Classification Search
CPC .......... G06F 17/30; G06F 12/14; G06F 17/00; G06F 17/2288
USPC ........... 715/229, 230, 234; 726/21; 713/193; 707/102, E17.005
See application file for complete search history.

(56) References Cited

U.S. PATENT DOCUMENTS

| 7,243,842 | B1 * | 7/2007 | Leon et al. .................... 235/381 |
| 7,561,287 | B1 * | 7/2009 | Antonacci .......... H04N 1/00209 358/1.15 |
| 8,429,118 | B2 * | 4/2013 | Battagin et al. .............. 707/602 |
| 2004/0268240 | A1 * | 12/2004 | Vincent, III ........ G06F 17/2247 715/234 |
| 2006/0206541 | A1 * | 9/2006 | Shimogori ........ G06F 17/30011 |

(Continued)

OTHER PUBLICATIONS

RFC2616: https://web.archive.org/web/20000815054159/http://www.w3.org/Protocols/rfc2616/rfc2616sec14.html, published 2000.*

*Primary Examiner* — Cesar B Paula
*Assistant Examiner* — Jian Huang
(74) *Attorney, Agent, or Firm* — Osha Liang LLP

(57) ABSTRACT

A method for managing an electronic document (ED) using an electronic content management (ECM) system, including: receiving a submission comprising the ED; generating a unique identifier (UID), a first version number, and a first mapping linking the UID and the first version number to the ED; inserting a first symbol corresponding to the UID and the first version number into the ED; generating a first archived document corresponding to the ED and comprising the first symbol; distributing the first archived document; receiving a submission comprising a revised version of the ED from a user; generating a second version number and a second mapping linking the UID and the second version number to the revised version; inserting a second symbol corresponding to the UID and the second version number into the revised version; and generating a second archived document corresponding to the revised version and comprising the second symbol.

17 Claims, 7 Drawing Sheets

(56) References Cited

U.S. PATENT DOCUMENTS

| | | | |
|---|---|---|---|
| 2008/0133295 A1* | 6/2008 | Cappel | G06Q 10/00 |
| | | | 705/36 T |
| 2008/0163364 A1* | 7/2008 | Ferlitsch | 726/21 |
| 2010/0017700 A1* | 1/2010 | Odean et al. | 715/230 |
| 2010/0097661 A1* | 4/2010 | Hoblit | H04N 1/32133 |
| | | | 358/405 |
| 2010/0241651 A1 | 9/2010 | Xiong et al. | |
| 2012/0233076 A1* | 9/2012 | Sutcliffe | G06Q 30/02 |
| | | | 705/50 |
| 2013/0048714 A1* | 2/2013 | Sharma | G06Q 20/3276 |
| | | | 235/379 |
| 2013/0099565 A1* | 4/2013 | Sachs | H02J 3/46 |
| | | | 307/25 |

\* cited by examiner

ELECTRONIC CONTENT MANAGEMENT WORKFLOW WITH DOCUMENT VERSIONING

CROSS-REFERENCE TO RELATED APPLICATIONS

The present application contains subject matter that may be related to the subject matter in U.S. patent application Ser. No. 13/954,775; filed on Jul. 30, 2013; and entitled: "ELECTRONIC CONTENT MANAGEMENT WORKFLOW".

BACKGROUND

Electronic Content Management (ECM) systems enable electronic documents (EDs) to be controlled in a workflow that enables multiple feature including: capture/input, record management, search, archiving, etc. Very often these EDs are generated in one editable document format (e.g., .PPTX, .DOCX, .XLSX) and archived in the workflow to another format that is less/not editable (e.g., .PDF). However, if a user accesses an archived document and wants to make further modifications to it, the user often does not have access to the original document on the ECM and has no easy way of discovering the original document location. In some cases, the user will manually recreate the document in an editable format (likely the format of the original document they cannot find), which is very inefficient. Regardless, users still wish to utilize ECMs to control EDs in one or more workflows.

SUMMARY

In general, in one aspect, the invention relates to a method for managing an electronic document (ED) using an electronic content management (ECM) system. The method comprises: receiving, by the ECM system, a submission comprising the ED; generating a unique identifier (UID), a first version number, and a first mapping linking the UID and the first version number to the ED; inserting, by the ECM system, a first symbol corresponding to the UID and the first version number into the ED; generating a first archived document corresponding to the ED and comprising the first symbol; distributing, by the ECM system, the first archived document to a plurality of users; receiving, by the ECM system, a submission comprising a revised version of the ED from a first user of the plurality of users; generating a second version number and a second mapping linking the UID and the second version number to the revised version; inserting a second symbol corresponding to the UID and the second version number into the revised version; and generating a second archived document corresponding to the revised version and comprising the second symbol.

In general, in one aspect, the invention relates to an electronic content management (ECM) system for managing an electronic document (ED). The system comprises: a processor; a version engine executing on the processor configured to generate a unique identifier (UID), a first version number for the ED, and a second version number for a revised version of the ED; a symbol engine executing on the processor and configured to: generate a first symbol corresponding to the UID and the first version number; and generate a second symbol corresponding to the UID and the second version number; a file converter configured to: generate a first archived document corresponding to the first ED and comprising the first symbol; and generate a second archived document corresponding to the revised version and comprising the second symbol; and a linking engine executing on the processor and configured to: generate a first mapping linking the UID and the first version number to the ED; and generate a second mapping linking the UID and the second version number to the revised version of the ED.

In general, in one aspect, the invention relates to a non-transitory computer readable medium (CRM) storing instructions for managing an electronic document (ED) using an electronic content management (ECM) system. The instructions comprise functionality for: receiving, using the ECM system, a submission comprising the ED; generating a unique identifier (UID), a first version number, and a first mapping linking the UID and the first version number to the ED; inserting, using the ECM system, a first symbol corresponding to the UID and the first version number into the ED; generating a first archived document corresponding to the ED and comprising the first symbol; distributing, using the ECM system, the first archived document to a plurality of users; receiving, using the ECM system, a submission comprising a revised version of the ED from a first user of the plurality of users; generating a second version number and a second mapping linking the UID and the second version number to the revised version; inserting a second symbol corresponding to the UID and the second version number into the revised version; and generating a second archived document corresponding to the revised version and comprising the second symbol.

Other aspects of the invention will be apparent from the following description and the appended claims.

DETAILED DESCRIPTION

Figure 1:
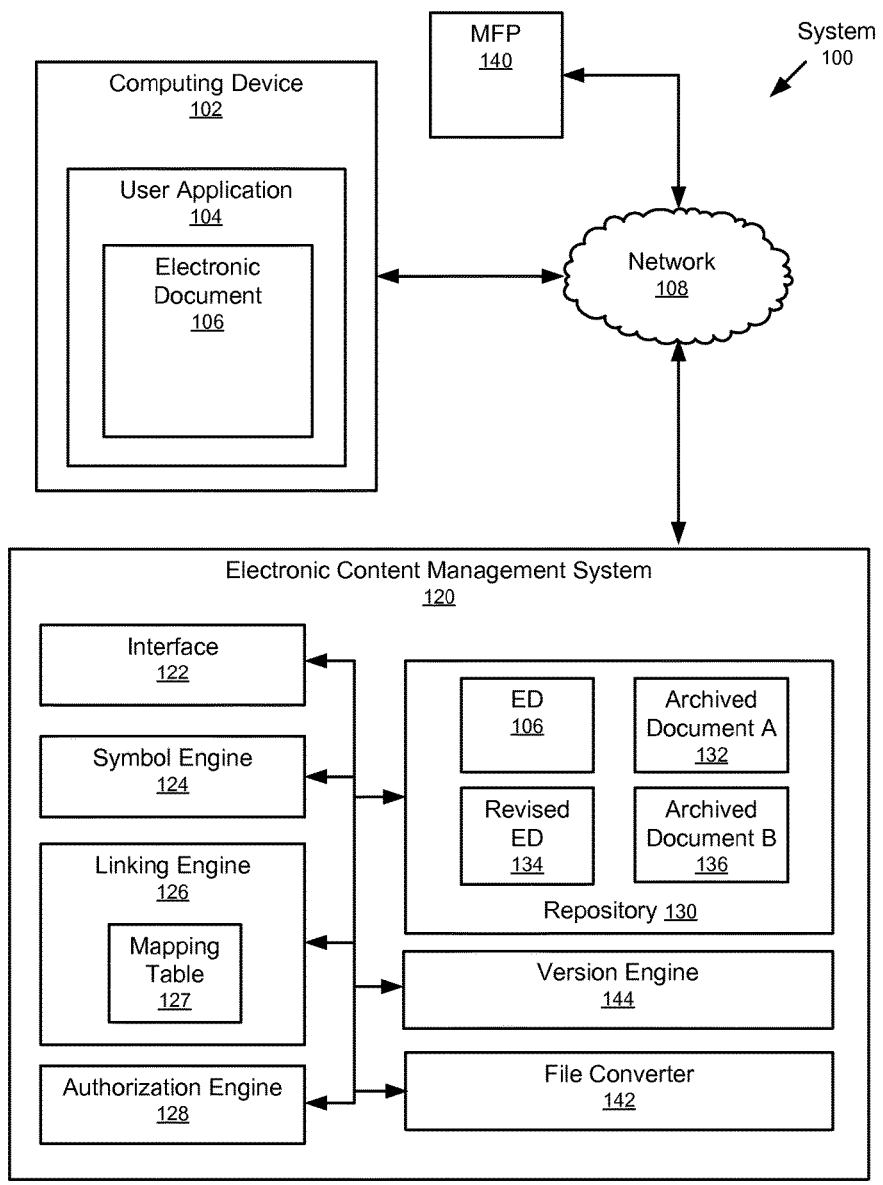
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide an ECM system for managing an ED and a method for managing an ED using an ECM system. When the ED is created, it may be submitted to the ECM for storage and access control. The ECM system generates a unique identifier (UID), an initial version number, and inserts/embeds an initial symbol (e.g., 2D barcode, data glyph) comprising the UID and the initial version number into the ED. An archived document (i.e., archived version) corresponding to the ED and also having the initial symbol is created. In one or more embodiments of the invention, it is more difficult to edit the archived document than the ED. For example, the ED may be in OOXML format and thus be easy to edit, while the archived document may be in PDF and thus be more difficult to edit. The archived document may be distributed by the ECM system to one or more users via email, fax, printers (i.e., hardcopy versions), uploaded to websites accessed by the users, and/or in response to user requests for the ED received by the ECM system.

In general, embodiments of the invention permit a user to request the ED from the ECM system by sending a request comprising the initial symbol to the ECM system. The request may include the archived document and/or an image obtained by scanning a hardcopy version of the archived document, as both have the initial symbol. The ED is identified from the initial symbol in the request, and assuming the user has the proper access rights, the ED (having the initial symbol) is sent to the user in response to the request.

In general, embodiments of the invention permit a user to submit a revised version of the ED to the ECM system. The revised version submitted by the user includes the initial symbol. The ECM system generates a subsequent version number and inserts/embeds a subsequent symbol (e.g., 2D barcode, data glyph) comprising the UID and the subsequent version number into the revised version of the ED. An archived document (i.e., archived version) corresponding to the revised version of the ED and also having the subsequent symbol is created.

FIG. 1 shows a system (100) in accordance with one or more embodiments of the invention. As shown in FIG. 1, the system (100) has multiple components including at least one computing device (102), a multifunction printer (MFP) (140), and an ECM system (120). The ECM system (120) and/or the computing device (102) may be a personal computer (PC), a desktop computer, a mainframe, a server, a telephone, a kiosk, a cable box, a personal digital assistant (PDA), an electronic reader, a mobile phone, a smart phone, a tablet computer, etc. The MFP (140) includes printing functionality and scanning functionality. The MFP (140) may also include emailing functionality, faxing functionality, document storage functionality, etc. In one or more embodiments of the invention, the computing device (102), the MFP (140), and the ECM system (120) are connected using one or more networks (e.g., network (108)) having wired and/or wireless segments. Although FIG. 1 shows only one computing device (102), only one MFP (140), and only one ECM system (120), the system (100) may have any number of computing devices operated by any number of users, MFPs, and ECM systems connected by one or more networks.

In one or more embodiments of the invention, the computing device (102) executes the user application (104). The user application (104) is a software application operated by a user and configured to obtain, input, generate, display, and/or print an ED (e.g., Electronic Document (106)). Accordingly, the user application (104) may be a word-processing application, a spreadsheet application, a desktop publishing application, a graphics application, a photograph printing application, an Internet browser, a slide show generating application, a form, etc. The user application (104) may generate new EDs and/or obtain existing EDs for revising/updating.

In one or more embodiments of the invention, the ED (106) includes one or more graphical features (e.g., text characters, images, graphics, etc.) to be displayed/printed on or across one or more pages. In one or more embodiments of the invention, the ED (106) is represented/defined using a format that makes the ED (106) easy to edit (e.g., .PPTX, .DOCX, and .XLSX of Office Open XML).

In one or more embodiments of the invention, the ECM system (120) enables EDs to be controlled in a workflow that enables such things as: capture/input, version control, record management, search, archiving, etc. In one or more embodiments of the invention, the ECM system (120) includes an interface (122), a symbol engine (124), a linking engine (126), an authorization engine (128), a repository (130), a file converter (142), and a version engine (144). Each of these components (122, 124, 126, 128, 130, 142, 144) is discussed below.

In one or more embodiments of the invention, the ECM system (120) includes the version engine (144). The version engine (144) is configured to generate a unique identifier (UID) of any length. The UID may be a random number. The UID may be alphanumeric. The UID may be based on a time/date (i.e., timestamp) that an ED was submitted to the ECM (discussed below). In one or more embodiments of the invention, the version engine (144) is configured to generate a version number for each revised version of an ED. The version engine (144) may generate a new version number for a newly revised version of the ED by incrementing the previous version number by a constant (e.g., 1, 0.1, 2.5, etc.). For example, the initial (i.e., original) ED may be assigned a version number of 1. The first revised version of the ED may be assigned a version number of 2. The next revised version of the ED may be assigned a version number of 3, etc. In one or more embodiments of the invention, the version number is a timestamp corresponding to the date/time the version of the ED was received.

In one or more embodiments of the invention, the ECM system (120) includes the symbol engine (124). In one or more embodiments of the invention, the symbol engine (124) is configured to generate a symbol (e.g., 1D barcode, 2D barcode, data glyph, plaintext, clipart, photograph, etc.) including the UID and a version number. The symbol may also include a filename and/or the time/date (i.e., timestamp) that an ED was received (discussed below). The symbol engine (124) may also be configured to insert/embed a symbol into an ED. In one or more embodiments of the invention, the symbol engine (124) is configured to extract the UID and the version number from a symbol.

In one or more embodiments of the invention, the ECM system (120) includes the file converter (142). The file converter (142) is configured to generate an archived document for an ED. In other words, the file converter (142) is configured to convert the ED into the archived document. Although the ED is editable, the archived document corresponding to the ED is not editable or is more difficult to edit than the ED. For example, the archived document may be in the portable document format (PDF). Moreover, any attempt by a user to undo the conversion, results in a document that lacks much of the formatting/effects in the original ED. Accordingly, this resulting document is less editable than the original ED. As discussed above, a symbol may be inserted into an ED. Accordingly, the archived document corresponding to the ED may also include the symbol.

In one or more embodiments of the invention, the ECM system (120) includes the repository (130). The repository (130) may correspond to a database or data warehouse of any type. As shown in FIG. 1, the repository (130) is configured to store the ED (106), the revised ED (134), archived document A (132) corresponding to the ED (106), and archived document B (136) corresponding to revised ED (134). Both the ED (106) and the revised ED (134) are editable. Both archived document A (132) and archived document B (136) are more difficult to edit than their corresponding EDs (106, 134). In one or more embodiments of the invention, the repository (130) does not store archived documents (132, 136). Instead, an archived document may be generated on-the-fly in response to a user's request for the archived document. In one or more embodiments of the invention, the repository (130) is external to the ECM system (120), but still accessible by the ECM system (120).

In one or more embodiments of the invention, the ECM system (120) includes the linking engine (126). The linking engine (126) is configured to generate mappings linking a UID and a version number to an ED and/or an archived document. In one or more embodiments of the invention, both the ED and the archived document have the symbol including the UID and the version number. Accordingly, the linking engine (126) may be configured to identify an ED and/or an archived document from a UID and a version number using a mapping.

In one or more embodiments of the invention, the linking engine (126) includes a mapping table (127) to manage mappings. For example, each row in the mapping table (127) may correspond to a different UID, and each column may correspond to a different version number. Each entry in the mapping table (127) may include a reference (e.g., pointer, filename, storage location, etc.) to an ED and/or archived document. In one or more embodiments of the invention, both the ED and the archived document have the symbol including the UID and the version number. In one or more embodiments of the invention, all EDs and archived documents linked to UIDs are in the repository (130). Although FIG. 1 shows the mapping table (127), the linking engine (126) may use any type of data structure to manage mappings.

In one or more embodiments of the invention, the ECM system (120) includes the authorization engine (128). The authorization engine (128) manages access rights for the documents stored in the repository (130). For example, some users may only be entitled to archived documents. Other users may be entitled to both EDs and archived documents. As another example, only some users may be entitled to submit EDs for storage in the repository (130). Any write and/or read access requests may be accepted or denied by the authorization engine (128) based on the user's credentials.

In one or more embodiments of the invention, the ECM system (120) includes the interface (122). The interface (122) is configured to distribute archived documents (132, 136) to one or more users by emailing the archived documents (132, 136), faxing the archived documents (132, 136), printing the archived documents (132, 136) (e.g., using MFP (140)), uploading the archived documents (132, 136) to a website, etc.

In one or more embodiments of the invention, the interface (122) is configured to receive, from a user, a request for an ED. This arises, for example, in scenarios where the user wishes to edit the ED. In one or more embodiments of the invention, the request includes a search string to locate the ED within the repository (130). The search string may correspond to one or more of the title, heading, author, etc. of the ED or any string found within the ED or associated with the ED.

As discussed above, when an ED is submitted to the ECM system (120), in one or more embodiments, a symbol is inserted into the ED. Accordingly, the request for the ED may include the symbol that has been inserted into the ED. The ED may be identified by extracting the UID and the version number from the symbol in the request, and then accessing a mapping linking the UID and the version number to the ED. Additionally or alternatively, the request itself may already include the UID and the version number but not have the symbol. Assuming the user has the proper access rights to the ED, the interface (122) is configured to respond to the request with the ED.

As also discussed above, in one or more embodiments, both the ED and the archived document corresponding to the ED are embedded with the same symbol. Accordingly, the request for the ED may include the corresponding archived document itself (i.e., the archived document is a file attached to/included with the request). In such embodiments, the UID and the version number are extracted from the symbol in the attached archived document. As another example, the request for the ED may include a scanned/faxed image (e.g., from MFP (140)) of at least one page of the archived document. In such embodiments, the UID and the version number are extracted from the symbol in the image. In one or more embodiments of the invention, the request is submitted by the MFP (140). The MFP (140) may have already extracted the UID and the version number from the image and/or the archived document. In such embodiments, the request might not need the image or the archived document if it includes the UID and the version number obtained by the MFP (140).

In one or more embodiments of the invention, the interface (122) is configured to receive submissions of EDs from users. Some submissions may include EDs that have never been managed by the ECM system (120). The EDs in such submissions might not include a symbol. Other submissions may include revised versions of EDs managed by the ECM system (120). The revised versions in the submissions may include a symbol.

Figure 2:
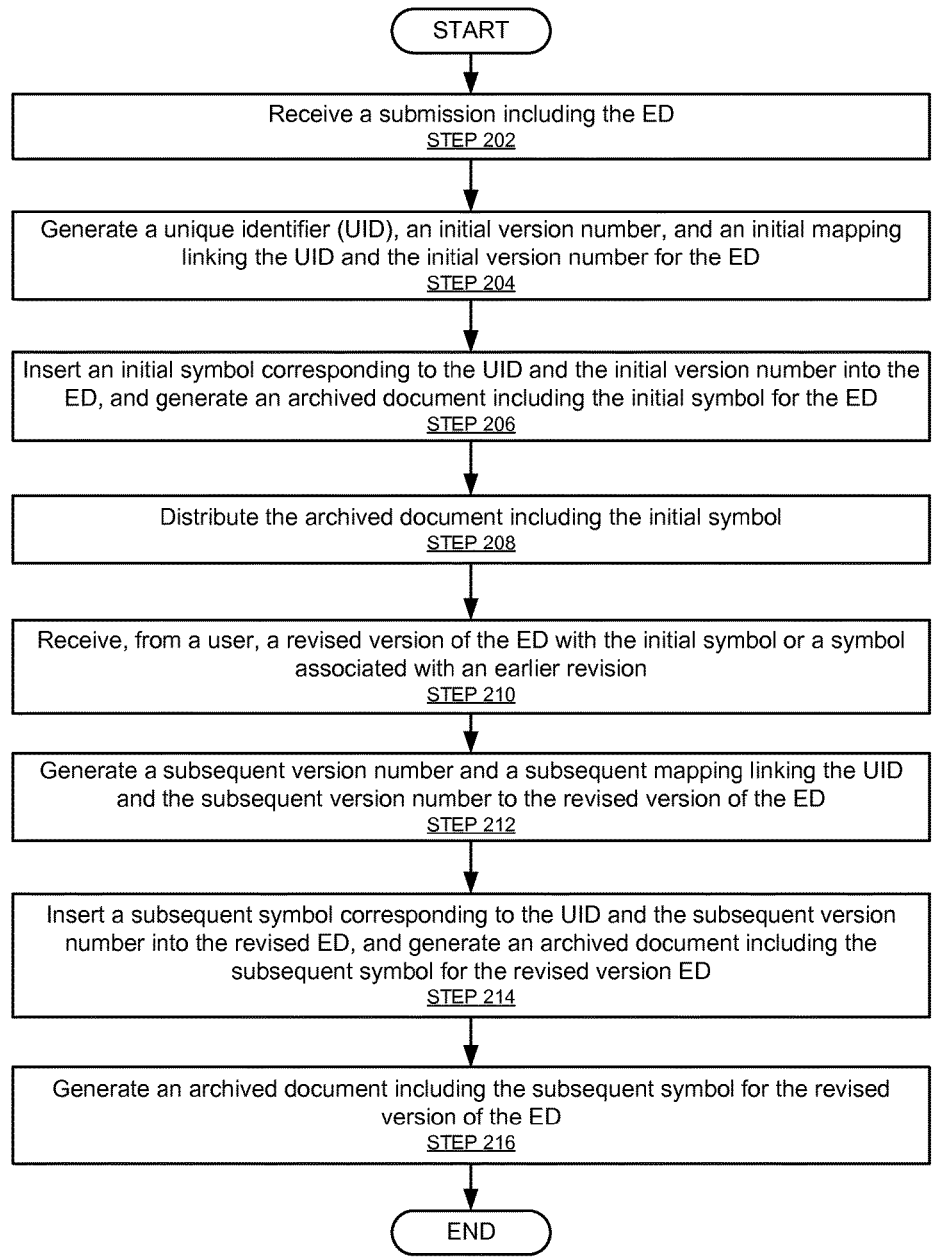
FIG. 2 and FIG. 3 show flowcharts in accordance with one or more embodiments of the invention.

FIG. 2 shows a flowchart in accordance with one or more embodiments of the invention. The process shown in FIG. 2 may be executed, for example, by one or more components (e.g., interface (122), symbol engine (124), linking engine (126), file converter (142), version engine (144)) of the ECM system (120), discussed above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, a submission including an ED is received (STEP 202). The ED may be submitted by a user and received by an ECM system. The ED is represented/defined using an editable document format that makes the ED easy to edit. For example, the ED may be in the Office Open XML format.

In STEP 204, a unique identifier (UID) and an initial version number are generated for the ED. The UID may be a randomly generated number or an alphanumeric string. The UID may include the filename of the submitted ED. For example, the UID may include the filename concatenated with a randomly generated alphanumeric string. In one or more embodiments of the invention, the UID and/or the initial version number is based on the date/time (i.e., timestamp) the ED was submitted. In one or more embodiments of the invention, the initial version number is 1 or 1.0. Further, in response to generating the UID and the initial version number, an initial mapping linking the UID and the first version number to the ED is created. The initial mapping may be recorded in a mapping table. The initial mapping may identify the ED by its filename and/or the location where it is (or will be) stored in the ECM.

In STEP 206, an initial symbol corresponding to the UID and the initial version number is created. The initial symbol may be a 1D or 2D barcode, a data glyph, plaintext, clip art, a photograph, etc. The initial symbol may include the UID and the initial version number. The initial symbol may include the UID, the initial version number, and the filename of the ED. Once the initial symbol exists, it is inserted (e.g., embedded) into the ED.

Further, an archived document is created for the ED. The archived document is generated by converting the ED to a different format that is more difficult, if not impossible, to edit. For example, the archived document may be in PDF. Like the ED, the archived document may include the initial symbol. Moreover, any attempt by a user to undo the conversion, results in a document that is missing much of the formatting/effects of the ED, and thus is also less editable.

In STEP 208, the archived document is distributed to one or more users. As discussed above, the archived document may include the initial symbol that has been inserted into the ED. The archived document may be emailed to one or more users, printed for one or more users, faxed to one or more users, uploaded to a website accessed by one or more users, sent in response to user requests received by the ECM, etc.

After the archived document corresponding to the ED has been distributed (STEP 208), a request for the ED and/or the archived document corresponding to the ED is received from a user. For example, perhaps the user wishes to edit/update the ED. As another example, the user might be in possession of an archived document for an older version of the ED and now wants the archived document for the latest version of the ED. The request may be generated by many different methods and have many different formats.

In one or more embodiments of the invention, the request includes a search string for locating the ED. The search string may correspond to one or more of the title, heading, author, etc. or any other string found within the ED or associated with the ED. The search string might or might not include the UID and/or the initial version number.

In one or more embodiments of the invention, the request includes the initial symbol previously inserted into the ED. For example, the archived document (having the initial symbol) may be attached to or included in the request. As another example, the request may include an image created by a scanner or MFP. The image corresponds to a scanned page of the archived document having the initial symbol.

If the request includes the search string, the ED may be identified using the search string. If the request includes the initial symbol or the UID and initial version number in plaintext, the UID and initial version number are extracted from the request, and the ED is identified from the initial mapping (i.e., the initial mapping specifies the ED corresponding to the UID and the initial version number). Assuming the user requesting the ED has the proper access rights, the ED is sent to the user in response to the request. The ED sent to the user has the initial symbol. If the user does not have the proper access rights, the request is denied or the archived document (not the requested editable ED) is sent to the user (e.g., for printing).

In STEP 210, a revised version of the ED is submitted to the ECM system. The revised version of the ED includes the initial symbol or the symbol associated with any previous revision submitted to the ECM system. The revised version may be submitted by the user that requested the ED or by a different user. The revised version may be in the same format as the ED. The submission including the revised version may include comments as to what has been revised and/or the reasoning for the revision(s). These comments may be accessible to future users.

In STEP 212, a subsequent version number for the revised version of the ED is generated. The subsequent version number is generated based on the initial version number. For example, the subsequent version number may equal the initial version number plus a constant (e.g., 1, 0.1, 2.5, etc.). The initial version number may be extracted from the initial symbol in the revised version of the ED. Additionally or alternatively, the initial version number may be identified from the initial mapping corresponding to the UID extracted from the initial symbol in the revised version of the ED. In one or more embodiments of the invention, a subsequent mapping is generated linking the UID and subsequent version number to the revised version of the ED. Generating the subsequent mapping may include populating an entry in a mapping table with the filename of the revised ED and/or the location in the ECM system where the revised version of the ED is (or will be) stored.

In STEP 214, a subsequent symbol corresponding to the UID and the subsequent version number is created. The subsequent symbol may be a 1D or 2D barcode, a data glyph, plaintext, clip art, a photograph, etc. The subsequent symbol may include the UID and the subsequent version number. The subsequent symbol may include the UID, the subsequent version number, and the filename of the revised ED. Once the subsequent symbol exists, it is inserted (e.g., embedded) into the revised ED. Specifically, the subsequent symbol may replace the initial symbol in the revised ED.

In STEP 216, an archived document corresponding to the revised version is generated. Like the revised version, the archived document corresponding to the revised version may include the subsequent symbol. The archived document is effectively the revised version of the ED in a format that is more difficult to edit. The archived document corresponding to the revised ED may be distributed (similar to STEP 208).

Figure 3:
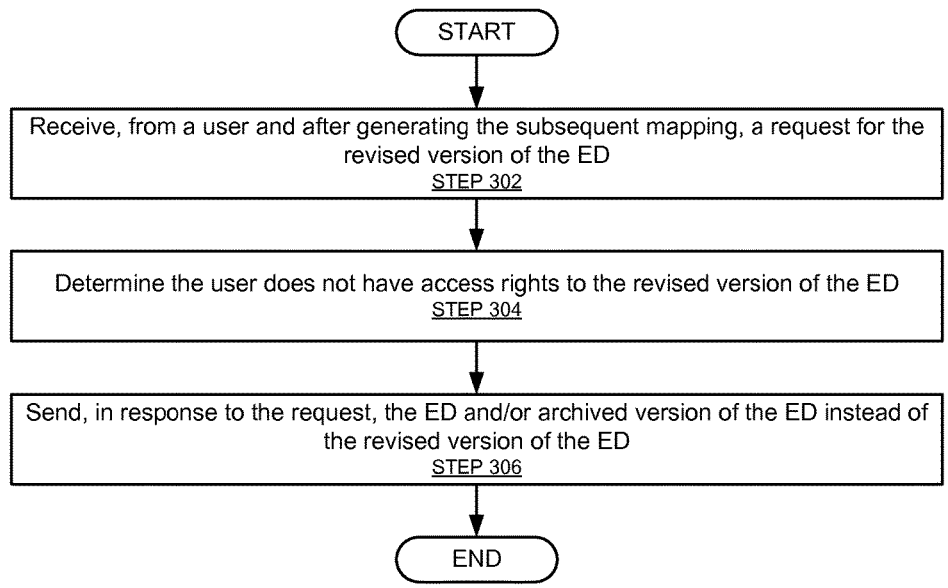

FIG. 3 shows a flowchart in accordance with one or more embodiments of the invention. The process shown in FIG. 3 may be executed, for example, by one or more components (e.g., interface (122), symbol engine (124), linking engine (126), file converter (142), version engine (144)) of the ECM system (120), discussed above in reference to FIG. 1. One or more steps shown in FIG. 3 may be omitted, repeated, and/or performed in a different order among different embodiments of the invention. Accordingly, embodiments of the invention should not be considered limited to the specific number and arrangement of steps shown in FIG. 3. In one or more embodiments of the invention, one or more of the steps in FIG. 3 are executed after the steps in FIG. 2.

Following execution of STEP 216 in FIG. 2, the subsequent mapping has been generated and the archived document corresponding to the revised ED has been distributed. Assume a user is in possession of the archived document corresponding to the revised ED. Moreover, assume the user wishes to access the revised version of the ED (e.g., to edit the revised ED). Accordingly, in STEP 302, the ECM system receives a request from the user for the revised ED. The request includes the subsequent symbol previously inserted into the revised version of the ED. The request for the revised version of the ED may have many formats. For example, in one format, the archived document possessed by the user is attached to or included in the request, and the subsequent symbol is extracted from the attached/included archived document. In another format, an image is attached to or included with the request for the revised version of the ED, and the subsequent symbol is extracted from the image. The image is created by the user scanning a page of the archived document. Specifically, the image is created by the user scanning the page of the archived document having the subsequent symbol.

The revised version of the ED is identified based on the subsequent symbol in the request (STEP 302) and the subsequent mapping. Specifically, the UID and the second version number are extracted from the subsequent symbol and the subsequent mapping is retrieved. The subsequent mapping specifies the revised version of the ED corresponds to the UID and the second version number.

In STEP 304, it is determined that the user does not have access rights to the revised version of the ED. However, it is determined that the user has access rights to the original ED. Accordingly, in STEP 306, the original ED and/or the archived version of the ED is sent to the user instead of revised version of the ED. Additionally or alternatively, the archived document corresponding to the revised version of the ED is sent to the user in response to the request.

Although FIG. 2 and FIG. 3 focus heavily on embodiments of the invention in which a user requests the latest versions of an ED, in one or more embodiments of the invention, the user might not want to pull the latest version of the document from the ECM. In such embodiments, the user might want an intermediate version of the ED, as it may include information not available in the most recent version of the ED. Accordingly, the ECM system may receive a user request for an intermediate version of the ED. The content of the user request may include one or more of a symbol, UID, version number, search string, etc. corresponding to the intermediate version.

In one or more embodiments of the invention, the ECM system maintains statistics on user requests. Specifically, the ECM system may track the number of user requests for each version of an ED, and whether the request was for the ED itself or for the archived document corresponding to the ED. These statistics may be queried by and/or reported to authorized personnel.

Although the mentioned embodiments have focused heavily on a single UID shared by both an ED and the archived document corresponding to the ED, in one or more embodiments of the invention, different UIDs may be generated for the ED and its archived document. The UID may include one or more characters explicitly identifying whether it corresponds to the editable ED or the archived document. In one or more embodiments of the invention, the ED and the archived document may include both UIDs. In one or more embodiments of the invention, the UID may include one or more characters identifying the user requesting the ED or the archived document was sent. This may be used for security purposes to track EDs and archived documents and confirm the identities of users submitting/requesting EDs. For example, assume an ED is sent to user A with a UID (in a symbol on the ED) identifying user A. At some point later, a revised version of the ED is submitted by user B. The revised version includes the symbol with the UID identifying user A. This mismatch may indicate a security violation and those responsible for the security violation.

Figure 4A:
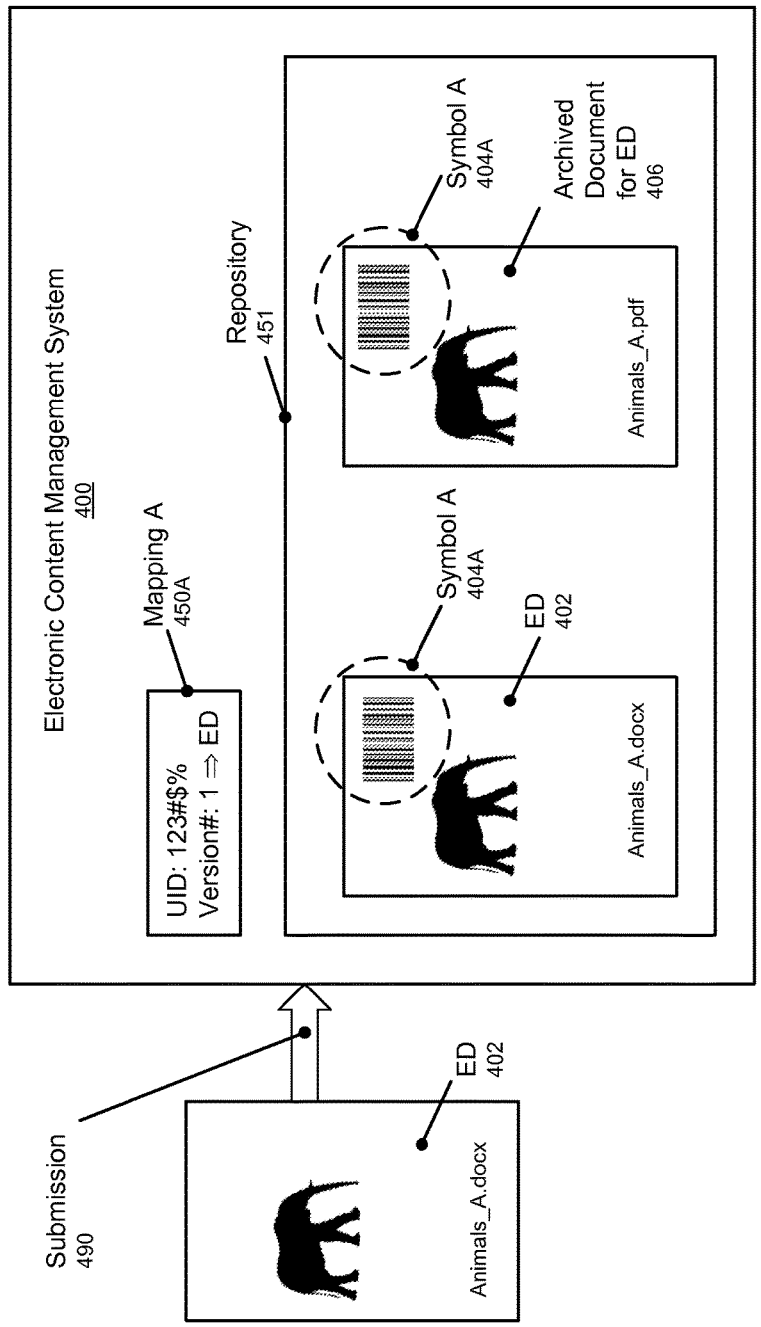
FIG. 4A-C shows an example in accordance with one or more embodiments of the invention.
Figure 4B:
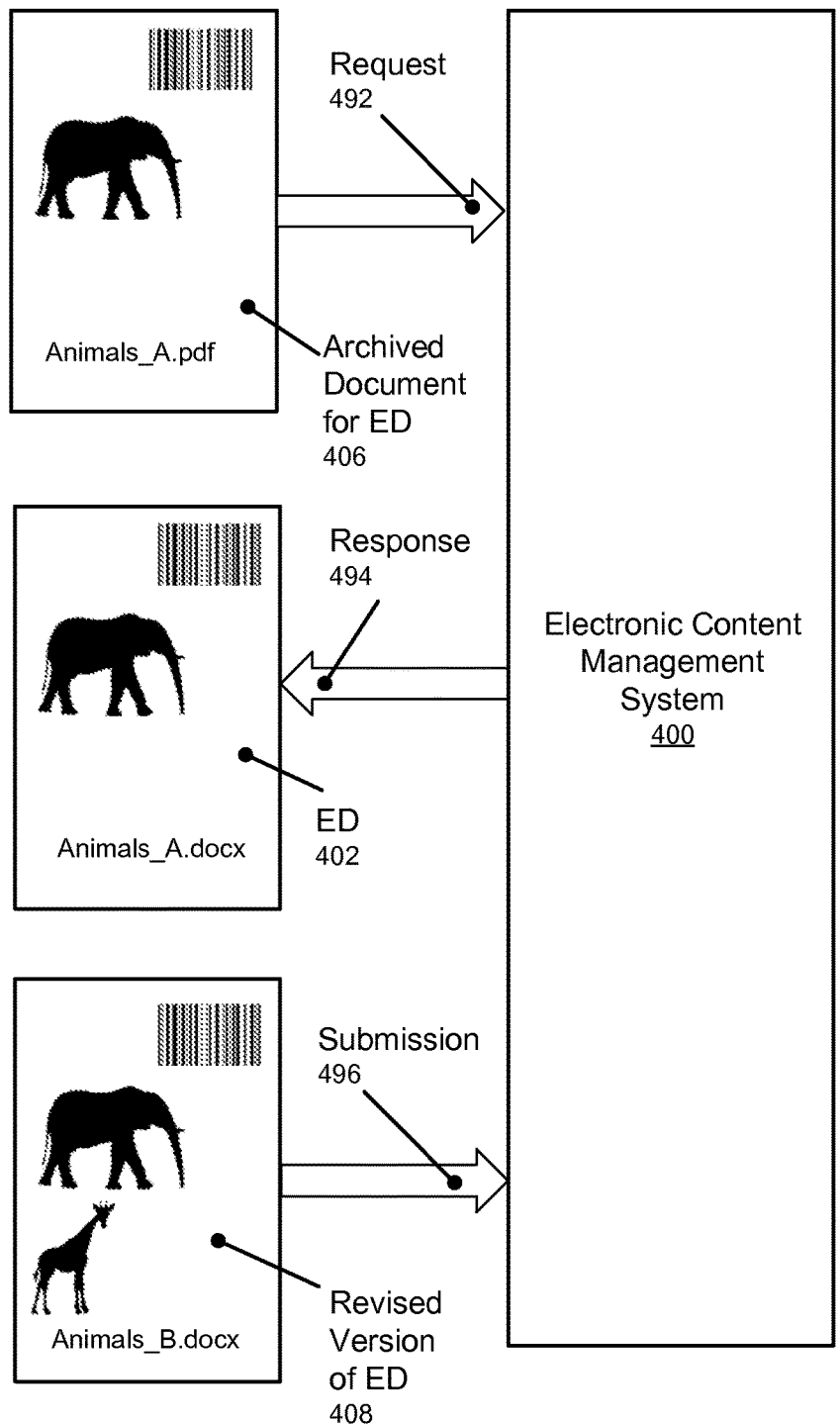
Figure 4C:
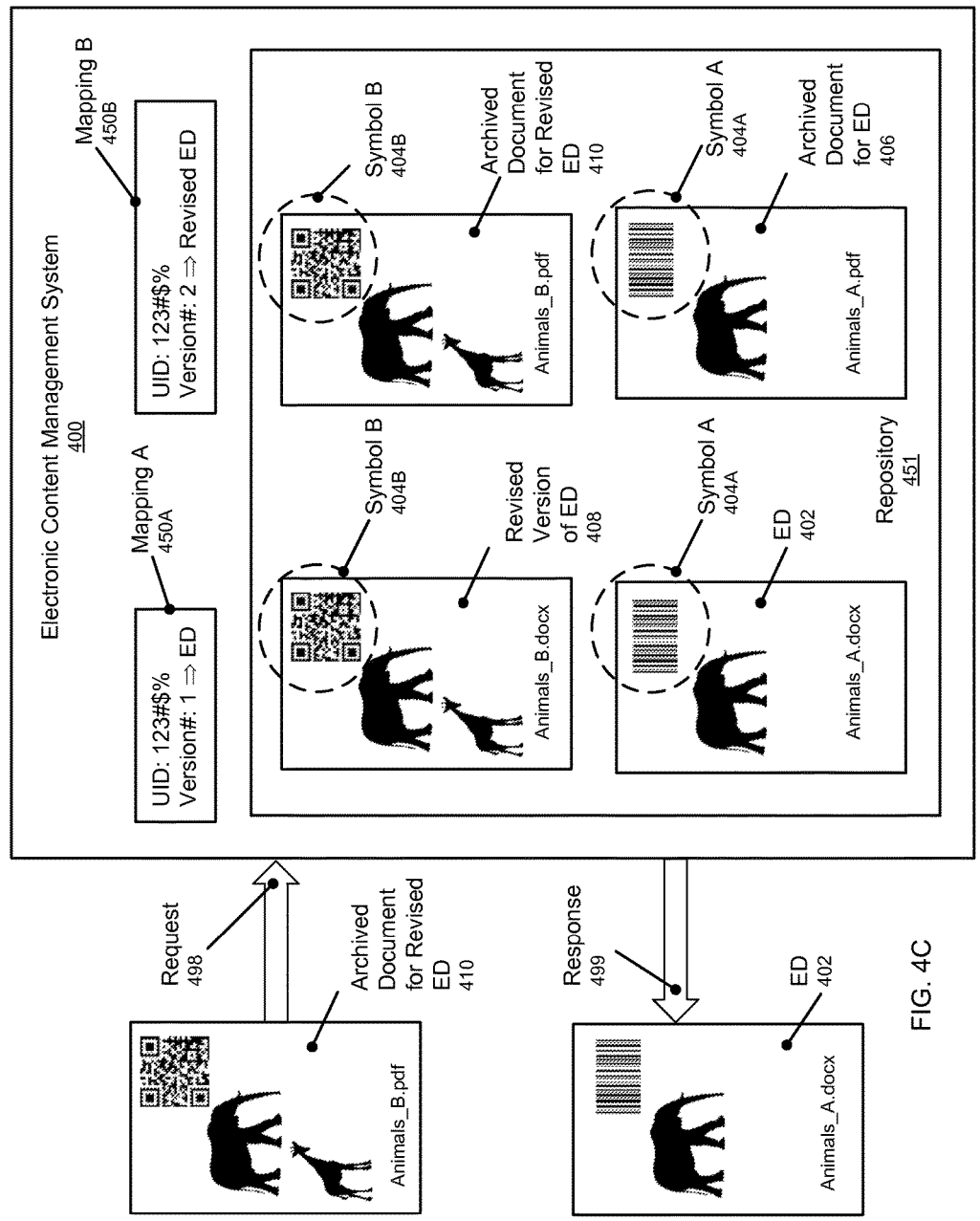

FIGS. 4A-4C show an example in accordance with one or more embodiments of the invention. As shown in FIG. 4A, there exists an ECM system (400). The ECM system (400) includes a repository (451). A user submits (490) an ED (402) to the ECM system (400). The ED (402) is in the .docx format and thus easily editable. In response to the submission (490), the ECM system (400) generates the UID: 123#$%, version number 1, and mapping A (450A) linking the UID and version number 1 to the ED (402). The ECM system (400) also generates symbol A (404A) (i.e., 1D barcode) comprising the UID and version number 1. Symbol A (404A) is inserted into the ED (402) and stored in the repository (451). Further, an archived document (406) corresponding to the ED is generated. The archived document (406) also includes symbol A (404A). The archived document (406) is essentially the ED (402) in PDF. Accordingly, it is more difficult to edit the archived document (406) than the ED (402). The archived document (406) may be distributed (e.g., emailed, printed, faxed, uploaded to website(s), etc.) to one or more users.

The events of FIG. 4B take place at some point after distributing the archived document (406). In FIG. 4B, the ECM system (400) receives, from a user, a request (492) for the ED. For example, the user may want access to the ED (402) in order to update it. Although the user has the archived document (406) corresponding to the ED (402), as discussed above, the archived document (406) is difficult to edit/update. Moreover, if the user attempted to convert the archived document (406) back to the format of the ED (402), much of the formatting/effects would be lost. As shown in FIG. 4B, the request (492) includes the archived document (406). For example, the archived document (406) is attached to the request (492) or embedded in the request (492).

Upon receiving the request (492), the ECM system (400) extracts the UID and version number 1 from symbol A (404) in the request (492). The ECM system (400) retrieves mapping A (450A) for the UID and version number 1, and identifies, from mapping A (450A), the ED (402) as the ED being requested by the user. Assuming the user has the proper access rights/permissions, the ED (402) is sent in response (494). As shown in FIG. 4B, the ED (402) in the response (494) includes symbol A (404A) (i.e., 1D barcode).

At some future point, the user submits (496) a revised version (408) of the ED. The revised version (408) includes symbol A (404A) (i.e., 1D barcode). Upon receiving the submission (496), the ECM system (400) extracts the UID and version number 1 from symbol A (404A) in the revised version (408).

FIG. 4C shows the ECM system (400) after receiving the submission (496) with the revised version of the ED (408). Version number 2 is generated by adding 1 to version number 1. Further, mapping B (450B) is generated linking the UID and version number 2 to the revised version (408) of the ED. Further still, symbol B (404B) (i.e., 2D barcode) is generated and comprises the UID and version number 2. Symbol B (404B) replaces symbol A (404A) in the revised ED (408).

Still referring to FIG. 4C, the repository (451) now stores the revised version (408) and archived document (410) corresponding to the revised version (408). Both the revised version (408) and the archived document (410) corresponding to the revised version (408) have symbol B (404B) (i.e., 2D barcode). The archived document (410) for the revised ED (408) may be distributed to multiple users.

At some future point, a request (498) is received from a different user for the revised ED (408). The request (498) includes the archived document (410) for the revised ED (408). Upon receiving the request (498), the ECM system (400) extracts the UID and version number 2 from symbol B (404B) in the request (498). The ECM system (400) then retrieves mapping B (450B) based on the extracted UID and version number 2. The ECM system (400) then identifies, based on mapping B (450B), request (498) is for the revised version (408) of the ED. However, assume the user does not have the access rights to obtain the revised version (408) of the ED. Accordingly, in response (499) to the request (498), the ED (402) instead of the revised version (408) of the ED is sent.

Embodiments of the invention may have one or more of the following advantages: giving an ECM system the ability to share archival electronic documents while enabling users who would like to edit the documents access to a more editable form of the document; easing discovery of the editable document using a visible UID (i.e., symbol) added to the document content; easy storage and access control to multiple version of the an ED, etc.

Figure 5:
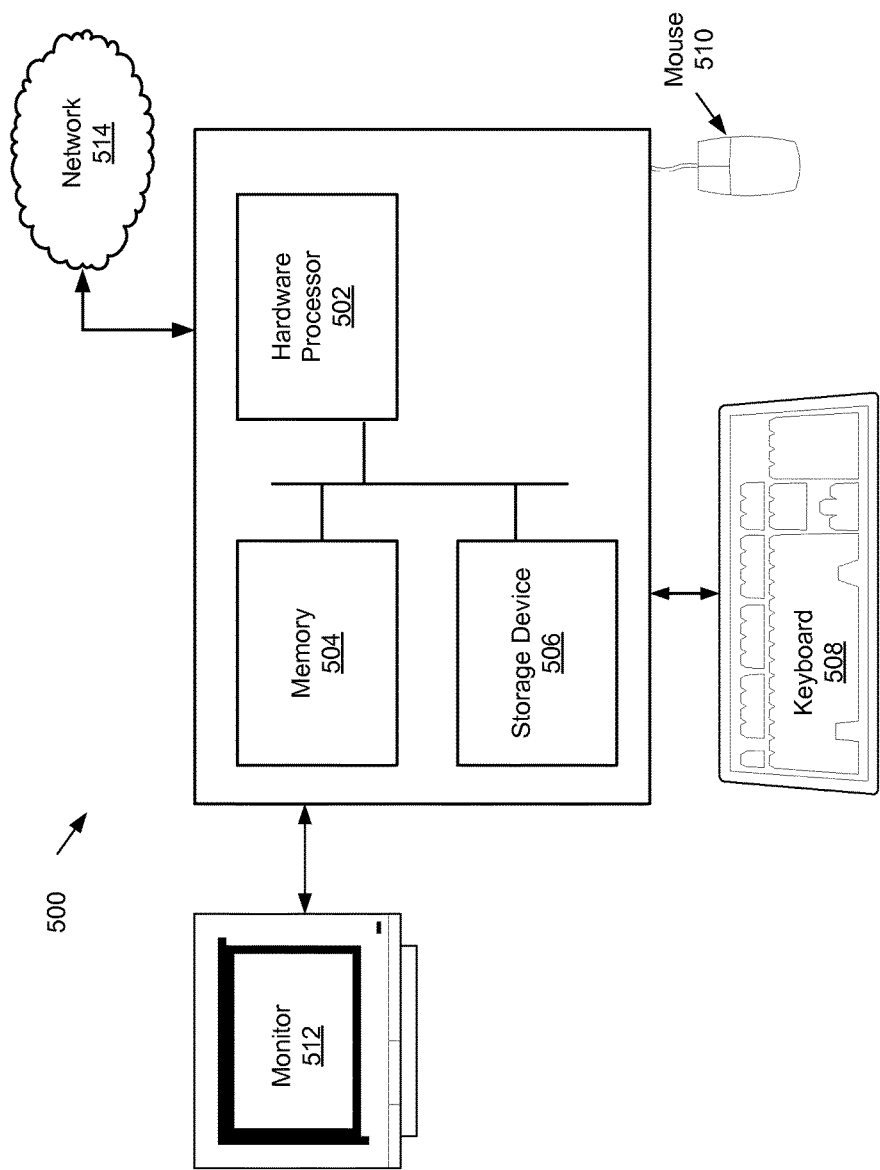
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502), an associated memory (504) (e.g. random access memory (RAM), cache memory, flash memory, etc.), a storage device (506) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (502) is hardware. For example, the processor may be an integrated circuit. The computer system (500) may also include input means, such as a keyboard (508), a mouse (510), or a microphone (not shown). Further, the computer system (400) may include output means, such as a monitor (512) (e.g. a liquid crystal display (LCD), a plasma display, or cathode ray tube (CRT) monitor). The computer system (500) may be connected to a network (514) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g. the computing device, the page rendering device, the display device, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing an electronic document (ED) using an electronic content management (ECM) system, comprising: receiving, by the ECM system, a submission comprising the ED in a first file format; generating a unique identifier (UID), a first version number, and a first mapping linking the UID and the first version number to the ED; inserting, by the ECM system, a first graphical symbol corresponding to the UID and the first version number into the ED, wherein the first graphical symbol is visible content in ED; generating a first archived document corresponding to the ED and comprising the first graphical symbol, wherein the first archived document is in a second file format; distributing, by the ECM system, the first archived document to a plurality of users; receiving, by the ECM system, a submission comprising a revised version of the ED from a first user of the plurality of users, wherein the revised version of the ED comprises the first graphical symbol, wherein the ECM system is storing the ED when the revised version of the ED is received, and wherein the revised version of the ED comprises user content that is different from the user content of the ED; generating a second version number and a second mapping linking the UID and the second version number to the revised version; inserting a second graphical symbol corresponding to the UID and the second version number into the revised version; generating a second archived document corresponding to the revised version and comprising the second graphical symbol; receiving, by the ECM system and from a second user of the plurality of users, a first request comprising the second archived document; determining, by the ECM system, that the first request is for the revised version of the ED based on the second graphical symbol of the second archived document; and sending, in response to the second user having access rights to the ED but not the revised version, the ED to the second user.

2. The method of claim 1, wherein the first graphical symbol is at least one selected from a group consisting of a two-dimensional (2D) barcode and a data glyph.

3. The method of claim 1, wherein the ED is in Open Office XML format (OOXML), and wherein the first archived document is in portable document format (PDF).

4. The method of claim 1, further comprising: receiving, by the ECM system and from the first user, a second request for the ED; extracting the UID and the first version number from the second request; identifying the ED based on the UID and the first version number extracted from the second request by accessing the first mapping; and sending, by the ECM system, the ED comprising the first graphical symbol to the first user.

5. The method of claim 4, wherein the second request comprises the first archived document, and wherein the UID and the first version number are extracted from the first graphical symbol in the first archived document.

6. The method of claim 4, wherein the second request comprises a scanned page from the first archived document, and wherein the UID and the first version number are extracted from the first graphical symbol on the scanned page.

7. The method of claim 4, wherein the second request is generated by a multifunction printer (MFP) operated by the first user, wherein the MFP obtains the UID and the first version number from the first graphical symbol in the first archived document, and wherein the second request comprises the UID and the first version number obtained by the MFP.

8. The method of claim 1, further comprising: extracting, in response to the submission comprising the revised version, the UID and the first version number from the first graphical symbol in the revised ED, wherein the second version number is generated in response to extracting the UID from the revised version; and removing, prior to generating the second archived document, the first graphical symbol from the revised version of the ED.

9. A non-transitory computer readable medium (CRM) storing instructions for managing an electronic document (ED) using an electronic content management (ECM) system, the instructions comprising functionality for: receiving, using the ECM system, a submission comprising the ED in a first file format; generating a unique identifier (UID), a first version number, and a first mapping linking the UID and the first version number to the ED; inserting, using the ECM system, a first graphical symbol corresponding to the UID and the first version number into the ED, wherein the first graphical symbol is visible content in the ED; generating a first archived document corresponding to the ED and comprising the first graphical symbol, wherein the first archived document is in a second file format; distributing, using the ECM system, the first archived document to a plurality of users; receiving, using the ECM system, a submission comprising a revised version of the ED from a first user of the plurality of users, wherein the revised version of the ED comprises the first graphical symbol, wherein the ECM system is storing the ED when the revised version of the ED is received, and wherein the revised version of the ED comprises user content that is different from the user content of the ED; generating a second version number and a second mapping linking the UID and the second version number to the revised version; inserting a second graphical symbol corresponding to the UID and the second version number into the revised version; generating a second archived document corresponding to the revised version and comprising the second graphical symbol; receiving, by the ECM system and from a second user of the plurality of users, a first request comprising the second archived document; determining, by the ECM system, that the first request is for the revised version of the ED based on the second graphical symbol of the second archived document; and sending, in response to the second user having access rights to the ED but not the revised version, the ED to the second user.

10. The non-transitory CRM of claim 9, the instructions further comprising functionality for: receiving, using the ECM system and from the first user, a second request for the ED; extracting the UID and the first version number from the second request; identifying the ED based on the UID and the first version number extracted from the second request by accessing the first mapping; and sending, using the ECM system, the ED comprising the first graphical symbol to the first user.

11. The non-transitory CRM of claim 10, wherein the second request comprises the first archived document, and wherein the UID and the first version number are extracted from the first graphical symbol in the first archived document.

12. The non-transitory CRM of claim 10 wherein the second request comprises a scanned page from the first archived document, and wherein the UID and the first version number are extracted from the first graphical symbol on the scanned page.

13. The non-transitory CRM of claim 10, wherein the second request is generated by a multifunction printer (MFP) operated by the first user, wherein the MFP obtains the UID and the first version number from the first graphical symbol in the first archived document, and wherein the second request comprises the UID and the first version number obtained by the MFP.

14. The non-transitory CRM of claim 9, the instructions further comprising functionality for: extracting, in response to the submission comprising the revised version, the UID and the first version number from the first graphical symbol in the revised ED, wherein the second version number is generated in response to extracting the UID from the revised version; and removing, prior to generating the second archived document, the first graphical symbol from the revised version of the ED.

15. An electronic content management (ECM) system for managing an electronic document (ED), comprising: a processor; a version engine executing on the processor configured to generate a unique identifier (UID), a first version number for the ED, and a second version number for a revised version of the ED; a repository storing the ED in a first file format; a symbol engine executing on the processor and configured to: generate a first graphical symbol corresponding to the UID and the first version number; and generate a second graphical symbol corresponding to the UID and the second version number; a file converter operatively connected to the repository and configured to: generate a first archived document corresponding to the first ED and comprising the first graphical symbol, wherein the first graphical symbol is visible content in the ED, wherein the first archived document is in a second file format; and generate, after receiving the revised version of the ED, a second archived document corresponding to the revised version of the ED and comprising the second graphical symbol, wherein the revised version of the ED comprises user content that is different from the user content of the ED, wherein the repository is storing the ED when the revised version of the ED is received, and wherein the revised version of the ED comprises the first graphical symbol; a linking engine executing on the processor and configured to: generate a first mapping linking the UID and the first version number to the ED; and generate a second mapping linking the UID and the second version number to the revised version of the ED; an authorization engine storing access rights of the first user and a second user; and an Interface configured to: distribute the first archived document to a plurality of users including a first user and a second user; receive, from the first user and after the first archived document is distributed, a first request for the ED; send the ED comprising the first graphical symbol to the first user in response to the first request; and receive, from the second user, a second request comprising the second archived document; determine that the second request is for the revised version of the ED based on the second graphical symbol of the second archived document; and send, in response to the second user having access rights to the ED but not the revised version, the ED to the second user.

16. The ECM system of claim 15, wherein the interface is further configured to: receive, from the first user and after sending the ED, a submission comprising the revised version of the ED, wherein the revised version of the ED in the submission comprises the first graphical symbol, and wherein the linking engine is further configured to: Identify, by accessing the first mapping, the ED from the UID and the first version number extracted from the first request; and identify, by accessing the first mapping, the ED from the UID and the first version number extracted from the first graphical symbol in the revised version.

17. The ECM system of claim 16, wherein the first request comprises a scanned page from the first archived document, and wherein the UID and the first version number are extracted from the first graphical symbol on the scanned page.

\* \* \* \* \*